(12) United States Patent
Jelks (10) Patent No.: US 7,065,302 B1
(45) Date of Patent: Jun. 20, 2006

(54) HIGH EFFICIENCY OPTICAL FEEDBACK MODULATOR AND METHOD OF OPERATION

(75) Inventor: Edward Christian Jelks, Englewood, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 927 days.

(21) Appl. No.: 09/663,038

(22) Filed: Sep. 15, 2000

(51) Int. Cl.
  *H04B 10/02* (2006.01)
(52) U.S. Cl. .................. 398/196; 398/198; 398/183
(58) Field of Classification Search ............... 398/198, 398/201, 154, 195; 385/1–3; 359/245
  See application file for complete search history.

(56) References Cited

U.S. PATENT DOCUMENTS

| | | | | |
|---|---|---|---|---|
| 4,340,272 A | | 7/1982 | Papuchon et al. | 350/96.14 |
| 5,134,517 A | | 7/1992 | Marcerou et al. | 359/341 |
| 5,359,449 A | * | 10/1994 | Nishimoto et al. | 398/198 |
| 5,488,503 A | | 1/1996 | Schaffner et al. | 359/245 |
| 5,495,359 A | | 2/1996 | Gertel et al. | 359/245 |
| 5,515,192 A | * | 5/1996 | Watanabe | 398/198 |
| 5,532,857 A | | 7/1996 | Gertel et al. | 359/154 |
| 5,546,414 A | | 8/1996 | Pfeiffer | 372/18 |
| 5,548,433 A | * | 8/1996 | Smith | 398/155 |
| 5,559,624 A | * | 9/1996 | Darcie et al. | 398/72 |
| 5,654,818 A | | 8/1997 | Yao | 359/246 |
| 5,687,018 A | | 11/1997 | Funaki | 359/245 |
| 5,754,714 A | * | 5/1998 | Suzuki et al. | 385/5 |
| 5,781,327 A | * | 7/1998 | Brock et al. | 359/249 |
| 6,091,864 A | * | 7/2000 | Hofmeister | 385/2 |
| 6,289,142 B1 | * | 9/2001 | Yamada | 385/1 |
| 6,337,755 B1 | * | 1/2002 | Cao | 398/97 |
| 6,396,605 B1 | * | 5/2002 | Heflinger et al. | 398/140 |
| 6,556,327 B1 | * | 4/2003 | Ohya et al. | 398/185 |
| 2003/0076563 A1 | * | 4/2003 | Lemoff et al. | 359/158 |

* cited by examiner

*Primary Examiner*—David C. Payne
(74) *Attorney, Agent, or Firm*—Marsh Fischmann & Breyfogle LLP (57) ABSTRACT

A high efficiency optical feedback modulator and method of operation are provided. The high efficiency optical feedback modulator (30) includes an optical modulator (52) and an optical feedback system (54). The optical modulator (52) includes first and second optical inputs (66a, 68a) and first and second optical outputs (66b, 68b). The optical feedback system (54) is coupled between the second optical output (68b) and the second optical input (68a). The second optical input (68a) receives an optical feedback signal (70) from the optical feedback system (54). The first optical input (66a) receives an input light beam (56). The input light beam (56) and the optical feedback signal (70) are modulated with an electronic input signal (26a) to produce a high modulation depth optical signal (36) output from the first optical output (66b). The high efficiency optical feedback modulator (30) achieves a slope efficiency that is an order of magnitude better than conventional optical modulators, corresponding to an RF link gain improvement of 100 times better than conventional optical modulators.

24 Claims, 5 Drawing Sheets

HIGH EFFICIENCY OPTICAL FEEDBACK MODULATOR AND METHOD OF OPERATION

TECHNICAL FIELD OF THE INVENTION

This invention relates generally to the field of fiber optic systems, and more particularly to a high efficiency optical feedback modulator and method of operation.

BACKGROUND OF THE INVENTION

Fiber optic systems utilize light transmitted through an optic fiber to communicate information. Fiber optic systems are used in many applications, from the relatively simple, such as a fiber optic telecommunications system, to the complex, such as an optical computer. Fiber optic systems have many advantages over electronic systems, including, greater information carrying capacity and smaller size, as well as being resistant to electromagnetic interference and relatively inexpensive to fabricate and install.

To illustrate the general operation of a fiber optic system, the operation of a fiber optic communication system is described. Fiber optic communication systems operate by modulating a received electronic signal, such as a phone call, into an optical signal. The optical signal is transmitted through the optic fiber to its destination. The optical signal is then demodulated, and an electronic signal having the same characteristics as the received signal is output.

Fiber optic communication systems generally comprise a transmitter, an optic fiber, and a receiver. The transmitter receives an electronic signal and an input light beam. The input light beam is a beam of light produced by a laser with constant optical intensity. The optical intensity of the input light beam is modulated, or varied, in direct response to the electronic signal to produce an optical signal. The optical signal is then transmitted through the optic fiber to the receiver. The receiver includes photodetectors that convert light into electrical current in direct proportion to the optical intensity of the light striking the photodetectors. Accordingly, the variation in the optical intensity of the optical signal produces a corresponding variation in the electrical signal produced by the photodetectors, thereby demodulating the optical signal into an electronic signal.

A technical disadvantage is that the variation in optical intensity of an optical signal due to the input electrical signal is relatively small in conventional optical modulators. The greater the variation in the optical intensity (modulation depth), the greater the variation in the electrical signal produced by the optical receiver. Accordingly, the greater the modulation depth relative to the system noise, the fewer the transmission errors.

Another technical disadvantage of conventional fiber optic systems is that the optical signal must often be conditioned to correct for attenuation and dispersion of the optical signal as the optical signal travels through the optic fiber. Conditioning is often performed by optical repeaters that are placed in-line with the optic fiber to receive and repeat the optical signal. The distance between optical repeaters is generally a function of the strength of the modulated optical signal. The greater the modulation depth of the optical signal, the greater the spacing of optical repeaters, and the less the cost associated with the fiber optic system.

SUMMARY OF THE INVENTION

Accordingly, a need has arisen for an improved optical modulator. The present invention provides a high efficiency optical feedback modulator and method of operation that substantially reduces or eliminates problems associated with prior systems and methods.

In accordance with one embodiment of the present invention, a high efficiency optical feedback modulator is provided. The high efficiency optical feedback modulator comprises an optical modulator and an optical feedback system. The optical modulator has at least two optical inputs and at least two optical outputs. The optical feedback system is coupled between at least one of the optical inputs and at least one of the optical outputs. The optical feedback system operates to communicate an optical feedback signal from the optical output to the optical input. The optical feedback system may also include an optical amplifier that amplifies the optical feedback signal. In a preferred embodiment, the optical modulator comprises a Mach-Zehnder optical modulator having a first and second 3 dB coupler.

In another embodiment of the present invention, a high efficiency optical feedback modulator comprises an optical modulator and an optical feedback system, wherein the optical modulator includes a first and a second optical input and a first and a second optical output. The optical feedback system couples the second optical output to the second optical input and operates to communicate an optical feedback signal from the second optical output to the second optical input. An input light beam is communicated to the first optical input. The optical modulator operates to modulate the input light beam and the optical feedback signal in response to an electrical signal, and to output a high modulation depth optical signal from the first optical output. The optical modulator may include one or more phase modulators. Each phase modulator electro-optically varies the phase of the respective optical signal. The optical modulator may include a first and a second coupler. In the preferred embodiment, the optical modulator comprises a Mach-Zehnder two-by-two optical modulator having 3 dB couplers. The optical feedback system may include an optical amplifier disposed between the second optical output and the second optical input that operates to boost the optical feedback signal.

In accordance with another embodiment of the present invention, a fiber optic system is provided. The fiber optic system comprises a high efficiency optical feedback modulator that is operable to receive an electronic input signal and intensity modulate an input light beam with the electronic input signal to produce a high modulation depth optical signal. The high efficiency optical feedback modulator includes an optical modulator and an optical feedback system. The optical modulator includes at least two optical inputs and at least two optical outputs. The optical feedback system couples at least one of the optical outputs to at least one of the optical inputs. The fiber optic system also includes an optic fiber coupled to an optical output of the optical modulator and operates to communicate the high efficiency optical signal to an optical receiver. The optical receiver operates to convert the high modulation depth optical signal into an electronic output signal that can be output to a destination system. The optical receiver includes a photodetector that converts the high modulation depth optical signal into an electrical signal.

In accordance with another implementation of the present invention, a method for producing a high modulation depth optical signal is provided. In accordance with this implementation, the method comprises communicating an input light beam to a first optical input of an optical modulator and simultaneously communicating an optical feedback signal from a second optical output of the optical modulator to a second optical input of the optical modulator. The input light beam and the optical feedback signal are coupled to produce a first and a second optical signal. At least one of the optical signals is intensity modulated with an electronic input signal to produce a first and a second phase shift optical signal. The phase shift optical signals are then coupled to produce the high modulation depth optical signal and the optical feedback signal. In a particular implementation, the optical feedback signal is amplified prior to communicating the optical feedback signal to the second optical input of the optical modulator.

The present invention provides several technical advantages. For example, the high efficiency optical feedback modulator produces an optical signal having greater modulation depth than conventional optical signals. Specifically, the modulator slope efficiency of the high efficiency optical feedback modulator is an order of magnitude better than conventional optical modulators. This corresponds to an RF link gain improvement of one hundred times better than conventional optical modulators. Accordingly, the high modulation depth optical signal improves the dynamic range of the optical signal and the signal-to-noise ratio of the optical signal. This reduces the negative affects of signal distortion and increases the detectability of the signal within the high modulation depth optical signal. Accordingly, transmission errors within the optic fiber system are reduced.

Another technical advantage of the present invention is that the present invention can easily be retrofitted into existing fiber optic systems. In particular, the optical feedback system can be easily integrated into existing optical modulators and will immediately improve the performance of the fiber optic system. Accordingly, the costs associated with retrofitting an existing fiber optic system are reduced.

Another technical advantage of the present invention is that the improved dynamic range and signal-to-noise ratio of the high modulation depth optical signal allows the spacing between optical repeaters to be increased as compared to conventional optical signals. Accordingly, fewer optical repeaters are required within an optical fiber system, which reduces the cost of the optical fiber system.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which.

DETAILED DESCRIPTION OF THE INVENTION

FIGS. 1 through 5 illustrate a high efficiency optical feedback modulator as used in a fiber optic communication system. As described in greater detail below, the high efficiency optical feedback modulator comprises an optical modulator and an optical feedback system. The optical modulator has at least two optical inputs and at least two optical outputs. The optical feedback system couples one of the optical outputs to one of the optical inputs. As a result, the modulation depth in the optical signal produced by the high efficiency optical feedback modulator is greater than the modulation depth that can be produced by conventional optical modulators.

Although the high efficiency optical feedback modulator is illustrated in terms of a fiber optic communication system, the high efficiency optical feedback modulator may be used in any other suitable fiber optic device or system. For example, the high efficiency optical feedback modulator may be used in satellite communication systems, threat receivers, optical switches, or other suitable applications.

Figure 1:
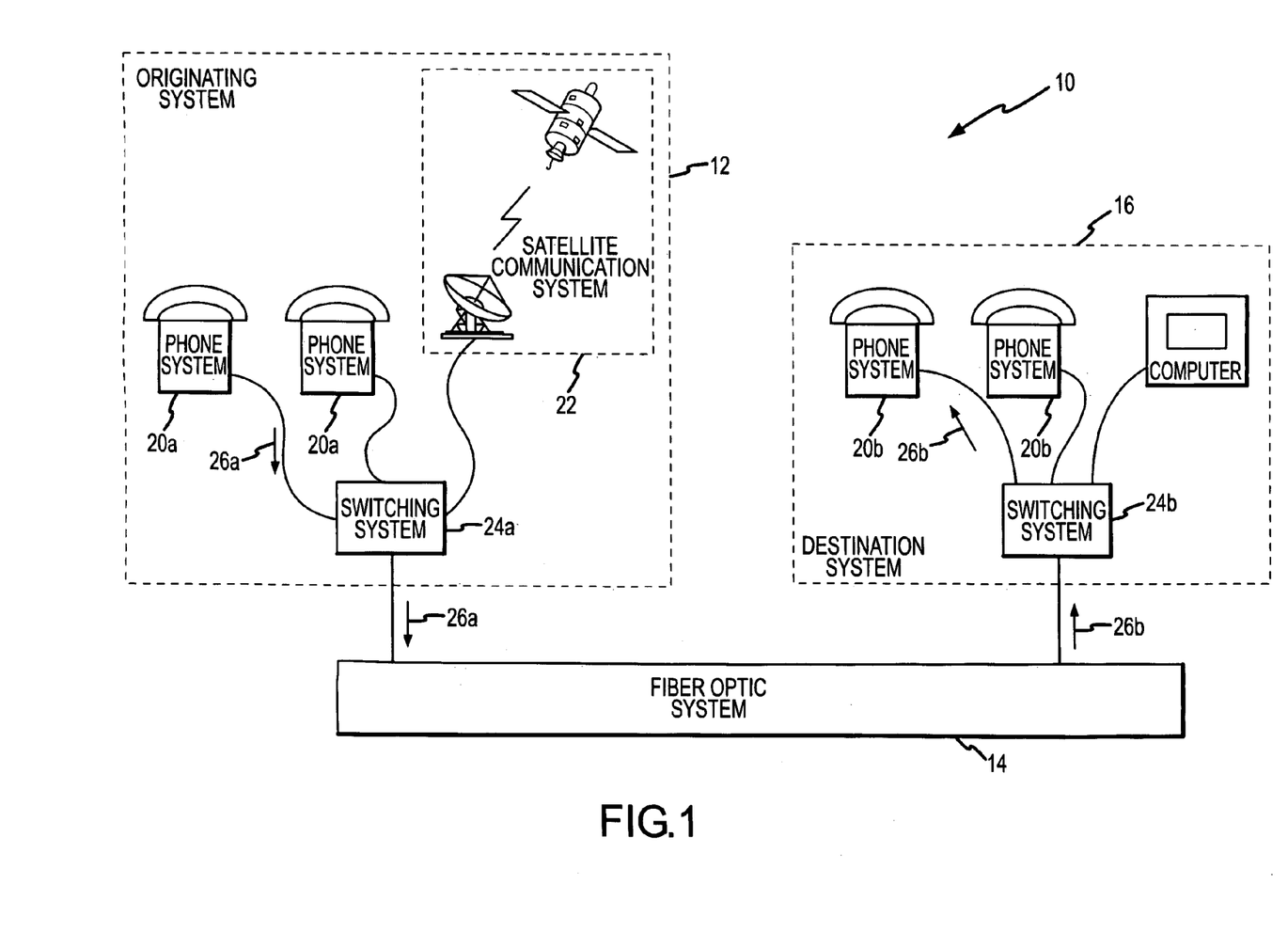
FIG. 1 is a schematic diagram illustrating a communication system in accordance with the present invention.

FIG. 1 is a schematic diagram illustrating a typical communications system 10. The communications system 10 includes an originating system 12, a fiber optic system 14, and a destination system 16. In the embodiment illustrated, the originating system 12 and the destination system 16 each comprise a telecommunication system. In particular, the originating system 12 is shown with a phone system 20a and a satellite communication system 22 coupled to a switching system 24a. The switching system 24a receives and routes electronic signals from the phone system 20a and the satellite communication system 22 as required. Similarly, the destination system 16 is shown with a phone system 20b coupled to a switching system 24b. Although the originating system 12 and the destination system 16 are illustrated in terms of various telecommunication systems, it shall be understood that the originating system 12 and the destination system 16 may comprise other suitable systems and devices without departing from the scope of the present invention.

In operation, the originating system 12 produces an electronic input signal 26a to be routed through the fiber optic system 14. As described in greater detail below, the fiber optic system 14 converts the electronic input signal 26a into an optical signal that is then converted into an electronic output signal 26b. The electronic output signal 26b is then communicated to the destination system 16. Essentially, the electronic input signal 26a is changing communication mediums, from electronic to optical to electronic, to take advantage of the benefits of the fiber optic system 14. Specifically, the fiber optic system 14 has the benefit of being able to simultaneously communicate thousands of signals at very high transmission speeds.

To illustrate the operation of the communication system 10, an example of a telephone call placed from a phone within the phone system 20a to a phone within the phone system 20b is provided. The telephone call, i.e., the electronic input signal 26a, is communicated from the phone system 20a to the switching system 24a, which determines how to route the electronic input signal 26a, i.e., the telephone call, to its destination. In this case, the electronic input signal 26a is routed to the fiber optic system 14. As described in greater detail below, the fiber optic system 14 converts the electronic input signal 26a into a high modulation depth optical signal (not expressly shown in this figure) that is communicated within the fiber optic system 14 to the destination system 16. The fiber optic system 14 converts the high modulation depth optical signal into the electronic output signal 26b and communicates the electronic output signal 26b to the destination system 16. In this example, the switching system 24b receives the output electronic signal 26b, i.e., the telephone call, and routes the electronic output signal 26b to the appropriate destination within the phone system 20b.

Figure 2:
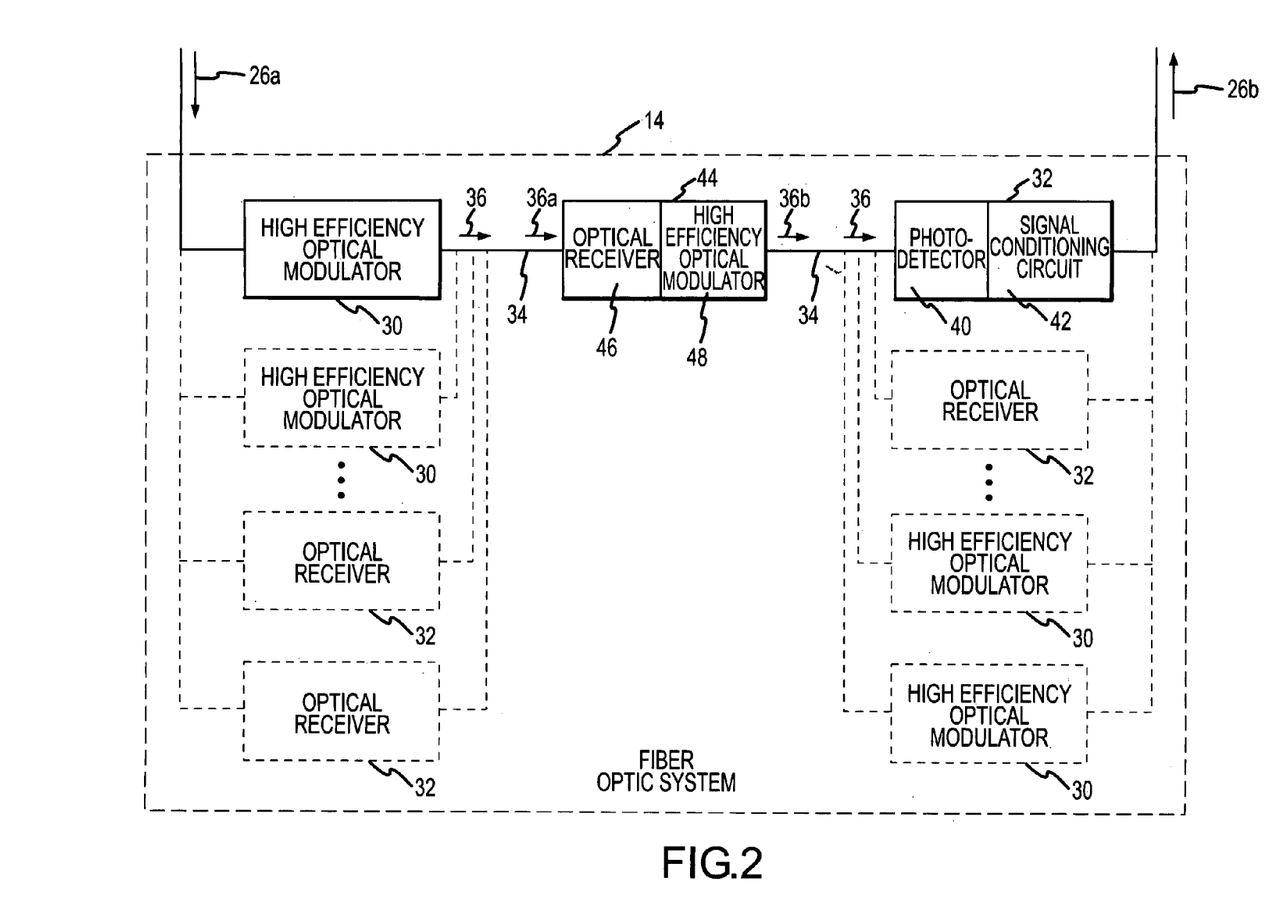
FIG. 2 is a schematic diagram illustrating a fiber optic system, as shown in FIG. 1, in accordance with the present invention.

FIG. 2 is a schematic drawing illustrating the fiber optic system 14. The fiber optic system 14 comprises at least one high efficiency optical modulator 30 coupled to at least one optical receiver 32 by an optic fiber 34. In practice, the fiber optic system 14 will generally comprise several hundred optical feedback modulators 30 and optical receivers 32. In particular, in some applications, a single optic fiber 34 supports multiple high efficiency optical modulators 30 and optical receivers 32. In these applications, each set of high efficiency optical modulators 30 and optical receivers 32 may operate at different optical frequencies to allow the simultaneous communication of multiple optic signals.

The high efficiency optical modulator 30 operates to modulate the electronic input signal 26a into a high modulation depth optical signal 36 that is communicated through the optic fiber 34 to the optical receiver 32. As described in greater detail below, the high efficiency optical modulator 30 modulates the intensity of an input light signal with the electronic input signal 26a. In other words, the voltage "highs" and "lows" that form the electronic input signal 26a are used to produce "highs" and "lows" in the intensity of the input light signal to form the high modulation depth optical signal 36.

The optical receiver 32 receives the high modulation depth optical signal 36 and demodulates, or converts, the high modulation depth optical signal 36 into the electronic output signal 26b. As described in greater detail below, the greater the modulation depth and/or the slope of the optical signal 36, the easier the optical receiver 32 can demodulate the optical signal 36 into the electronic output signal 26b. Specifically, the optical receiver 32 generally comprises a photodetector 40 and signal conditioning circuitry 42. The photodetector 40 produces an electrical signal (not expressly shown) in response to the intensity of light incident upon the photodetector 40. The photodetector 40 generally comprises a photovoltaic device that directly converts light into electricity in direct proportion to the light incident upon the photovoltaic device. Other suitable photodetectors 40 may also be used, or used in conjunction with the photovoltaic device, in the optical receiver 32. For example, the photodetectors 40 may comprise a photoconductive cell, photodiode, photoresistor, photoswitch, phototransistor, or any other suitable photodetector.

The electrical signal from the photodetector 40 forms the basis for the electronic output signal 26b. Specifically, the electrical signal produced by the photodetector 40 is related to the intensity of the light impinging the photodetector 40. As a result, the photodetector 40 converts the "highs" and "lows" in the intensity of the high modulation depth optical signal 36 into an electrical current with corresponding "highs" and "lows." The electrical current produced by the photodetector 40 is generally a low strength electrical signal that must be amplified to form the electronic output signal 26b.

Noise in the electrical signal can cause the signal conditioning circuitry 42 to misinterpret the electrical signal, which results in errors in the electronic output signal 26b. As discussed previously, the modulation depth, i.e., the difference in light intensity between the "highs" and "lows," is very small in conventional optical signals. Accordingly, the differential voltage amplitude, i.e., the voltage difference between the "highs" and "lows," in the electrical signal from conventional optical signals is very low. The smaller the differential voltage amplitude, the greater the negative impact of noise.

As discussed previously, the high modulation depth optical signal 36 has a greater modulation depth than a conventional optical signal. As a result, the electrical signal produced by the photodetector 40 from the high modulation depth optical signal 36 has a greater differential voltage amplitude than an electrical signal produced by a conventional optical signal. Accordingly, the high modulation depth optical signal 36 reduces the affects of noise.

The fiber optic system 14 may also include one or more high gain optical repeaters 44 that are spaced in-line with the optic fiber 34. High gain optical repeaters 44 condition the high modulation depth optical signal 36 by receiving a dispersed high modulation depth optical signal 36a and then transmitting a conditioned high modulation depth optical signal 36b. Each high gain optical repeater 44 generally comprises an optical receiver 46 and a high efficiency optical modulator 48. The optical receiver 46 operates in a manner similar to the optical receiver 32. Likewise, the high efficiency optical modulator 48 operates in a manner similar to the high efficiency optical modulator 30. The optical receiver 46 receives the dispersed high modulation depth optical signal 36a and produces an electrical output signal (not expressly shown) that is immediately communicated to the high efficiency optical modulator 48. The high efficiency optical modulator 48 modulates the electrical output signal from the optical receiver 46 to produce the conditioned high modulation depth optical signal 36b. In other words, the high gain optical repeater 44 forms a relay that receives and retransmits the high modulation depth optical signal 36.

Figure 3:
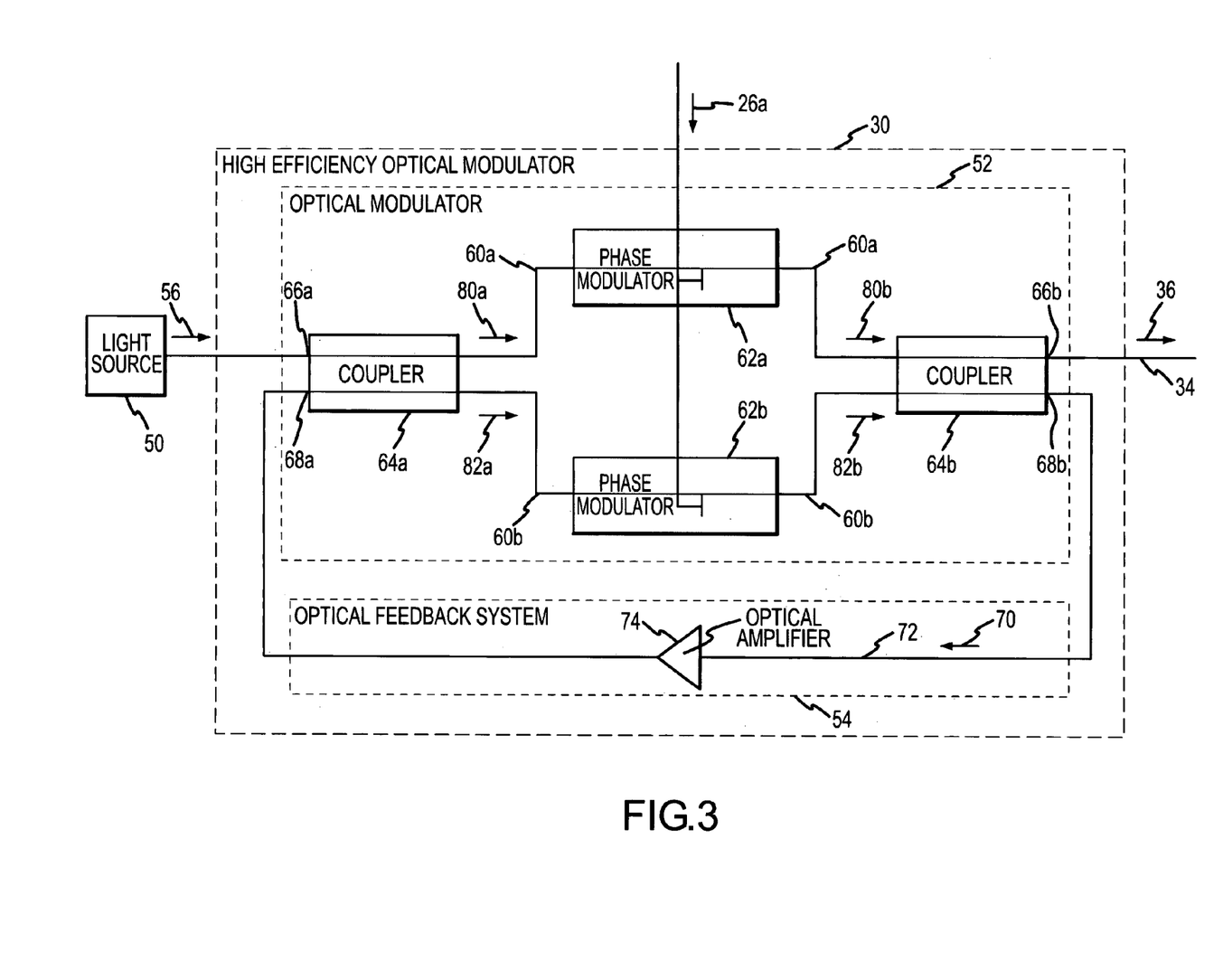
FIG. 3 is a schematic diagram illustrating a high efficiency optical feedback modulator, as shown in FIG. 2, in accordance with the present invention.

FIG. 3 is a schematic drawing illustrating the high efficiency optical modulator 30. The high efficiency optical modulator 30 comprises an input light source 50, an optical modulator 52, and an optical feedback system 54. The input light source 50 produces a constant intensity coherent input light beam 56 that is communicated to the optical modulator 52. In many commercial applications, the input light source 50 comprises a semiconductor laser diode.

In one embodiment, the optical modulator 52 comprises a Mach-Zehnder optical modulator. In this embodiment, the optical modulator 52 comprises a first and second waveguide, 60a and 60b respectively, a first and second phase modulator, 62a and 62b respectively, and a first and second coupler, 64a and 64b respectively. The first and second coupler, 64a and 64b respectively, are disposed within the first and second waveguides, 60a and 60b respectively. The first and second phase modulators, 62a and 62b respectively, are disposed within the respective first and second waveguides, 60a and 60b respectively between the first and second couplers, 64a and 64b respectively. The input light source 50 is coupled to the optical modulator 52 at an input 66a of the first waveguide 60a and the optic fiber 34 is coupled to an output 66b of the first waveguide 60a. The optical feedback system 54 is coupled between an input 68a and an output 68b of the second waveguide 60b. The first and second phase modulators, 62a and 62b respectively, are coupled to the originating system 12 (not expressly shown in this figure) and operatively receive the electronic input signal 26a. Although the optical modulator 52 is described in terms of a Mach-Zehnder optical modulator, it shall be understood that other suitable types of optical modulators 52 as well as suitable variations of the Mach-Zehnder optical modulator may be utilized without departing from the scope of the present invention.

The optical feedback system 54 communicates an optical feedback signal 70 from the output 68b of the second waveguide 60b to the input 68a of the second waveguide 60b. The optical feedback system 54 comprises an optic fiber 72 for communicating the optical feedback signal 70 to the input 68a of the second waveguide 60b. The optical feedback system 54 may also comprise an optical amplifier 74 that operates to boost the intensity of the optical feedback signal 70. The optical amplifier 74 preferably comprises an Erbium amplifier. It will be understood that the optical feedback system 54 may comprise other suitable components without departing from the scope of the present invention. For example, the optic fiber 72 may comprise a waveguide fabricated in combination with the optic modulator 52.

In operation, the input light beam 56 is communicated from the input light source 50 to the input 66a of the first waveguide 60a. The optical feedback system 54 communicates the optical feedback signal 70 to the input 68a of the second waveguide 60b. As described in greater detail below, the input light beam 56 and the optical feedback signal 70 interact with one another within the first coupler 64a, preferably a 3 dB coupler, to produce a first optical signal 80a in the first waveguide 60a and a second optical signal 82a in the second waveguide 60b. The first optical signal 80a is communicated through the first waveguide 60a through the first phase modulator 62a. Similarly, the second optical signal 82a is communicated through the second waveguide 60b through the second phase modulator 62b.

The first and second phase modulators, 62a and 62b, shift the phase angle between the first and second optical signals, 80a and 82a respectively, to produce a first phase shift optical signal 80b and a second phase shift optical signal 82b. The shift in the phase angle is generally produced by applying a voltage across the first and second phase modulators, 62a and 62b respectively, that induces an electric field across each of the waveguides, 60a and 60b respectively. The variation in the electric field across the waveguides, 60a and 60b respectively, electro-optically changes the refractive index within the waveguides, 60a and 60b respectively, to produce a phase shift between the phase shift optical signals, 80b and 82b respectively. The first phase shift optical signal 80b is communicated through the first waveguide 60a through the second coupler 64a. Similarly, the second phase shift optical signal 82b is communicated through the second waveguide 60b through the second coupler 64b.

The first and second phase shift optical signals, 80b and 82b respectively, are combined within the second coupler 64b, preferably a 3 dB coupler. The variation in phase between the phase shift optical signals, 80b and 82b respectively, changes the optical intensity of the optical signals output from the coupler 64b. For example, if the phase shift optical signals, 80b and 82b respectively, are exactly in phase, then they recombine to produce a maximum intensity optical signal. If instead the phase shift optical signals, 80b and 82b respectively, are 180 degrees out-of-phase, then they cancel producing no optical output.

The variation in the phase between the phase shift optical signals, 80b and 82b respectively, produces the high modulation depth optical signal 36 that is communicated from the output 66b of the first waveguide 60a to the optic fiber 34. The variation in phase between the first and second phase shift optical signals, 80b and 82b respectively, also produces the optical feedback signal 70 that is communicated from the output 68b of the second waveguide 60b to the optical feedback system 54.

Figure 4:
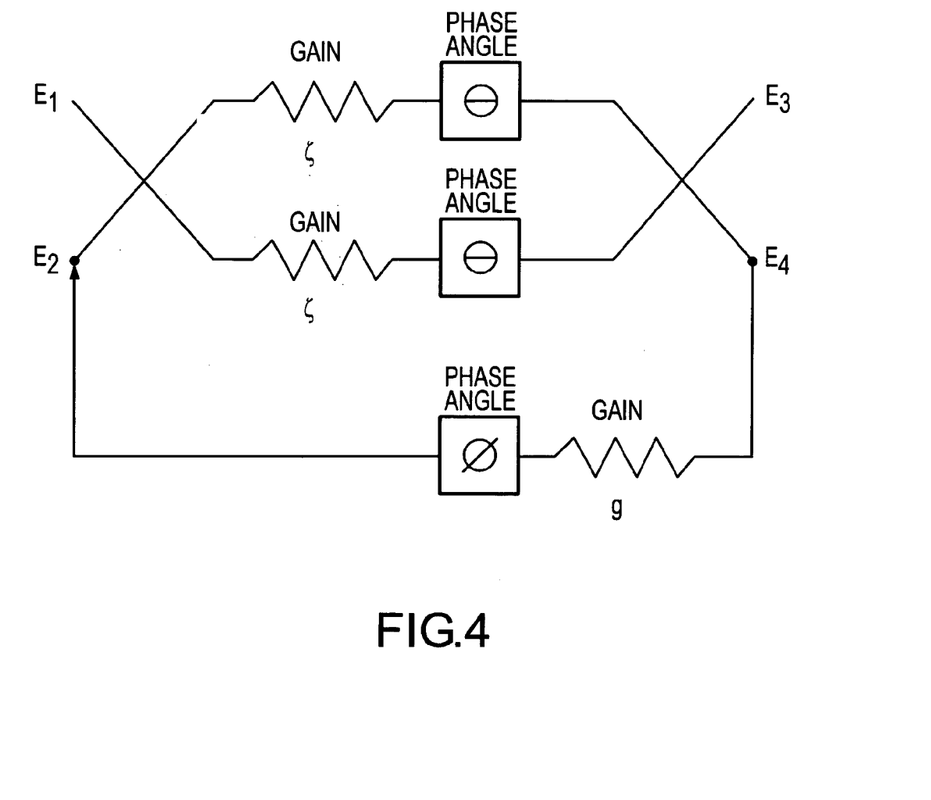
FIG. 4 is a model of the high efficiency optical feedback modulator of FIG. 3 useful in mathematically expressing the transfer function of the high efficiency optical feedback modulator in accordance with the present invention.

The operation of the high efficiency optical modulator 30 can be illustrated mathematically. Referring to the model shown in FIG. 4 wherein $\zeta$ represents the gain and $\theta$ represents the phase angle of the first and second phase modulators 62a, 62b and g represents the gain and $\phi$ represents the phase angle of the optical amplifier 74, it will be appreciated by those skilled in the art that the transfer function of the high efficiency optical modulator 30 is given by (ignoring time dependence):

$$\frac{E_3}{E_1} = j\zeta\left(\sin\theta + \frac{g\zeta\cos^2\theta}{1 + g\zeta\sin\theta}\right) \quad (1)$$

Squaring both sides of (1) the optical intensity versus phase angle $\theta$ of the high efficiency optical modulator 30 is obtain as follows:

$$\left(\frac{E_3}{E_1}\right)^2 = \zeta^2\left(\sin\theta + \frac{g\zeta\cos^2\theta}{1 + g\zeta\sin\theta}\right)^2 \quad (2)$$

Figure 5:
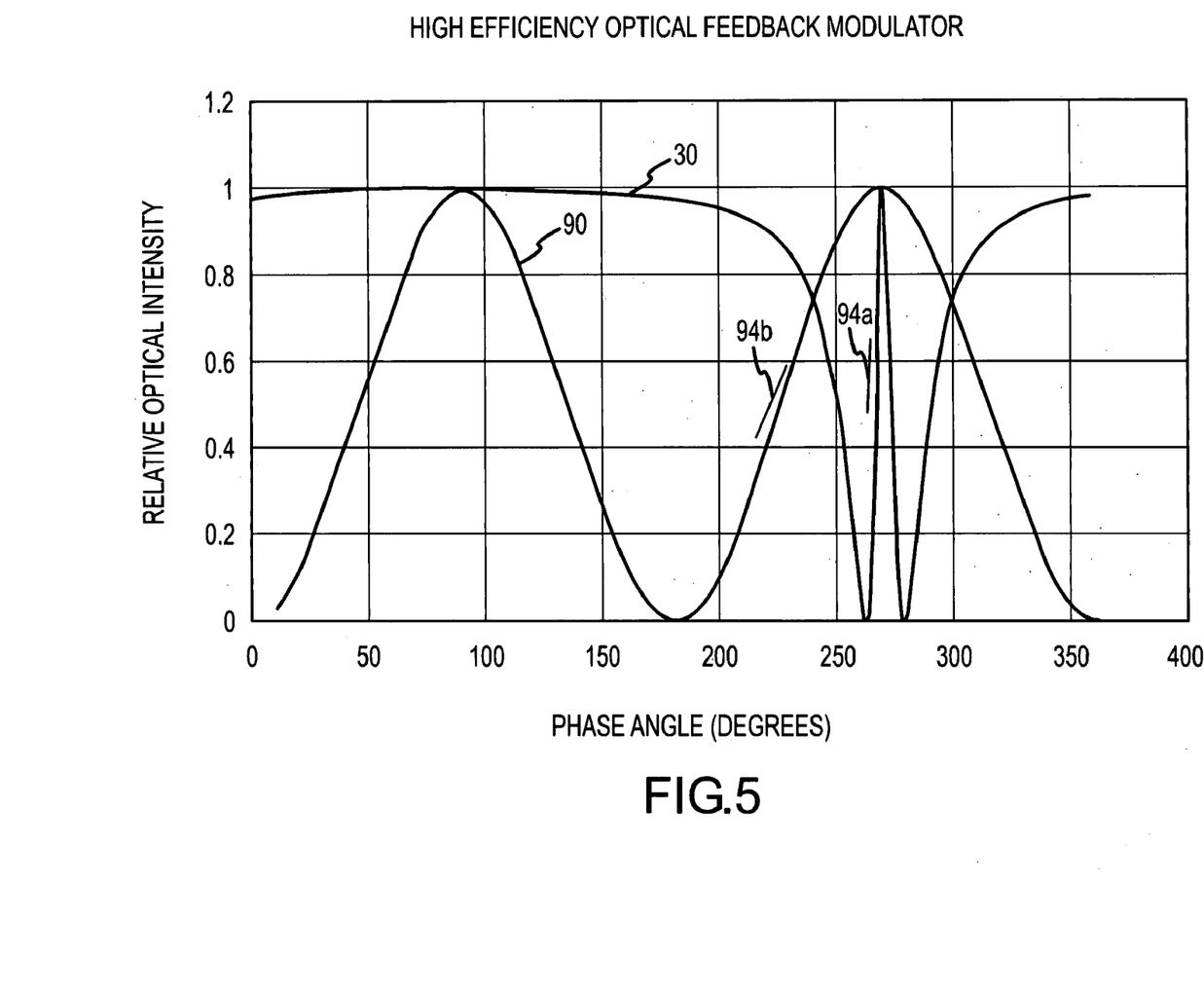
FIG. 5 is a graphical illustration of the optical intensity versus phase angle of a conventional optical modulator and the high efficiency optical feedback modulator of FIG. 3 in accordance with the present invention.

FIG. 5 shows a plot of the relative optical intensity versus phase angle of the high efficiency optical modulator 30 and a conventional optical modulator 90. As illustrated, the slope 94a of the high efficiency optical modulator 30 is greater than the slope 94b of the conventional optical modulator 90 from approximately 250 to 300 degrees. In the specified range, the slope 94a of the high efficiency optical modulator 30 is greater than the slope 94b of the conventional optical modulator 90 by a factor of approximately ten, which corresponds to an RF link gain improvement by a factor of approximately one-hundred. As a result of these improvements, an optic fiber system 14, with the high efficiency optical modulator 30, has an improved dynamic range with lower signal distortion.

Although the present invention has been described in several embodiments, various changes and modifications may be suggested to one skilled in the art. It is intended that the present invention encompass such changes and modifications that fall within the scope of the appended claims.

What is claimed is:

1. A high efficiency optical feedback modulator operable to produce a high modulation depth optical signal, comprising:

an optical modulator having a first and a second optical input and a first and a second optical output; and an optical feedback system coupling the second optical output to the second optical input and operable to communicate an optical feedback signal from the second optical output to the second optical input, the optical feedback system including an optical amplifier disposed between the second optical output and the second optical input, the optical amplifier being operable to increase an optical intensity of the optical feedback signal;

wherein the first optical input is operable to receive an input light beam and the optical modulator operates to modulate the input light beam and the optical feedback signal in response to an electrical signal applied around a selected phase angle operating point of the optical modulator within a specified range of phase angles wherein a slope of a transfer curve relating relative optical intensity of an optical signal output by the optical modulator versus phase angle of the optical modulator is at least 0.08725 per degree to output the high modulation depth optical signal from the first optical output.

2. The high efficiency optical feedback modulator of claim 1, wherein the optical feedback system comprises an optical waveguide.

3. The high efficiency optical feedback modulator of claim 1, wherein the electrical signal comprises an analog signal.

4. The high efficiency optical feedback modulator of claim 1, wherein the optical modulator further comprises a first and a second 3 dB coupler.

5. The high efficiency optical feedback modulator of claim 1, wherein the optical modulator further comprises a first and a second phase modulator.

6. The high efficiency optical feedback modulator of claim 1, wherein the high efficiency optical modulator is disposed within an optical repeater.

7. A high efficiency optical feedback modulator comprising:
    an optical modulator having at least two optical inputs and at least two optical outputs, an input light beam being receivable on at least one of the optical inputs; and
    an optical feedback system configured to feed an optical feedback signal from at least one of the optical outputs to at least one of the optical inputs, the optical feedback system including an optical amplifier disposed between said at least one of the optical outputs and said at least one of the optical inputs, the optical amplifier being operable to increase an optical intensity of the optical feedback signal;
    said optical modulator including a first optical coupler wherein the input light beam is combined with the optical feedback signal to produce first and second optical signals;
    said optical modulator being operable to modulate the first and second optical signals in response to an electrical signal to produce first and second phase shifted optical signals, the electrical signal being applied around a selected phase angle operating point of the optical modulator within a specified range of phase angles wherein a slope of a transfer curve relating relative optical intensity of an optical signal output by the optical modulator versus phase angle of the optical modulator is at least 0.08725 per degree;
    said optical modulator including a second optical coupler wherein the first phase shifted optical signal is combined with the second phased shifted optical signal to produce the optical feedback signal and a high modulation depth optical signal.

8. The high efficiency optical feedback modulator of claim 7, wherein the optical modulator comprises a Mach-Zehnder two-by-two optical modulator comprising a first and second optical input, and a first optical output that is the complement of a second optical output, and wherein the feedback system couples the second optical output to the second optical input.

9. The high efficiency optical feedback modulator of claim 7, wherein the optical feedback system comprises first and second optical waveguides coupled by said first and second optical couplers.

10. The high efficiency optical feedback modulator of claim 7, wherein the optical modulator comprises a first and a second phase modulator.

11. The high efficiency optical feedback modulator of claim 7, wherein the high efficiency optical feedback modulator is disposed within an optical repeater.

12. A fiber optic system comprising:
    a high efficiency optical feedback modulator operable to receive an electronic input signal;
    an optic fiber coupled to an optical output of the optical modulator and operable to communicate a high modulation depth optical signal; and
    an optical receiver operable to receive the high modulation depth optical signal and convert the high modulation depth optical signal into an electronic output signal;
    said high efficiency optical feedback modulator including an optical modulator having at least two optical inputs and at least two optical outputs and an optical feedback system feeding an optical feedback signal from at least one of the optical outputs to at least one of the optical inputs, said optical feedback system comprising an optical amplifier disposed between said at least one of the optical outputs and said at least one of the optical inputs, the optical amplifier being operable to increase an optical intensity of the optical feedback signal, said optical modulator being operable to receive an input light beam on at least one of the optical inputs, combine the optical feedback signal with the input light beam, and modulate the combined input light beam and optical feedback signal in response to the electronic input signal applied around a selected phase angle operating point of the optical modulator within a specified range of phase angles wherein a slope of a transfer curve relating relative optical intensity of an optical signal output by the optical modulator versus phase angle of the optical modulator is at least 0.08725 per degree to produce the high modulation depth optical signal.

13. The fiber optic system of claim 12, wherein the optical modulator comprises a Mach Zehnder two-by-two optical modulator.

14. The fiber optic system of claim 12, wherein the electronic input signal comprises an analog signal.

15. The fiber optic system of claim 12, further comprising an originating system operable to produce the electronic input signal, and a destination system operable to receive the electronic output signal.

16. The fiber optic system of claim 15, wherein the originating system comprises a cable television system and the destination system comprises a user distribution system.

17. The fiber optic system of claim 15, further comprising at least one high gain optical repeater disposed in-line with the optic fiber.

18. A method for producing a high modulation depth optical signal comprising:
    communicating an input light beam to a first optical input of an optical modulator;
    communicating an optical feedback signal from a second optical output of the optical modulator to a second optical input of the optical modulator, wherein an optical intensity of the optical feedback signal is amplified prior to communicating the optical feedback signal to the second optical input of the optical modulator;

coupling the input light beam with the optical feedback signal to produce a first and a second optical signal;

intensity modulating at least one of the optical signals in response to an electronic input signal applied to the optical modulator to produce a first and a second phase shift optical signal, the electronic input signal being applied around a selected phase angle operating point of the optical modulator within a specified range of phase angles wherein a slope of a transfer curve relating relative optical intensity of an optical signal output by the optical modulator versus phase angle of the optical modulator is at least 0.08725 per degree; and coupling the phase shift optical signals to produce the high modulation depth optical signal and the optical feedback signal.

19. A high efficiency optical feedback modulator comprising:

an optical modulator having at least two optical inputs and at least two optical outputs; and an optical feedback system coupling at least one of the optical outputs to at least one of the optical inputs, the optical feedback system including an optical amplifier disposed between said at least one of the optical outputs and said at least one of the optical inputs, the optical amplifier being operable to increase an optical intensity of the optical feedback signal;

wherein the optical modulator comprises a Mach-Zehnder two-by-two optical modulator comprising a first and second optical input, and a first optical output that is the complement of a second optical output, and wherein the feedback system couples the second optical output to the second optical input; and wherein the optical modulator modulates an input light beam received on the first optical input and an optical feedback signal received on the second optical input in response to an electronic input signal applied around a selected phase angle operating point of the optical modulator within a specified range of phase angles wherein a slope of a transfer curve relating relative optical intensity of an optical signal output by the optical modulator versus phase angle of the optical modulator is at least 0.08725 per degree to output a high modulation depth optical signal.

20. The high efficiency optical feedback modulator of claim 1, wherein the specified range of phase angles comprises 250 to 300 degrees.

21. The high efficiency optical feedback modulator of claim 7, wherein the specified range of phase angles comprises 250 to 300 degrees.

22. The fiber optic system of claim 12, wherein the specified range of phase angles comprises 250 to 300 degrees.

23. The method for producing a high modulation depth optical signal of claim 18, wherein the specified range of phase angles comprises 250 to 300 degrees.

24. The high efficiency optical feedback modulator of claim 19, wherein the specified range of phase angles comprises 250 to 300 degrees.

* * * * *